(12) United States Patent
Jelusic et al.

(10) Patent No.: US 8,300,311 B2
(45) Date of Patent: Oct. 30, 2012

(54) REAR PROJECTION SYSTEM, METHOD FOR PRODUCTION AND APPLICATION

(75) Inventors: Mitja Jelusic, Maribor (SI); Alex Miletic, Zalog (SI)

(73) Assignee: Glasstech DOO, Ljubljana-Polje (SI)

( * ) Notice: Subject to any disclaimer, the term of this patent is extended or adjusted under 35 U.S.C. 154(b) by 0 days.

(21) Appl. No.: 13/144,162

(22) PCT Filed: Jan. 20, 2010

(86) PCT No.: PCT/EP2010/000324
§ 371 (c)(1),
(2), (4) Date: Sep. 27, 2011

(87) PCT Pub. No.: WO2010/083993
PCT Pub. Date: Jul. 29, 2010

(65) Prior Publication Data
US 2012/0013977 A1    Jan. 19, 2012

(30) Foreign Application Priority Data
Jan. 20, 2009  (DE) .................. 10 2009 005 273

(51) Int. Cl.
*G03B 21/56* (2006.01)
*G03B 21/60* (2006.01)

(52) U.S. Cl. .................. 359/451; 359/453; 359/460

(58) Field of Classification Search .................. 359/453, 359/460, 451
See application file for complete search history.

(56) References Cited

U.S. PATENT DOCUMENTS

| | | | |
|---|---|---|---|
| 1,747,425 A | 2/1930 | Cawley | |
| 4,408,850 A | 10/1983 | Norek | |
| 5,521,659 A * | 5/1996 | Arnott | 353/119 |
| 6,466,368 B1 * | 10/2002 | Piepel et al. | 359/460 |
| 6,535,333 B1 * | 3/2003 | Piepel et al. | 359/453 |
| 6,644,816 B1 * | 11/2003 | Perra et al. | 353/119 |
| 6,747,796 B1 * | 6/2004 | Dorling | 359/452 |
| 6,813,074 B2 * | 11/2004 | Starkweather | 359/451 |
| 7,092,158 B2 | 8/2006 | Haas | |
| 7,824,039 B2 * | 11/2010 | Takito et al. | 353/69 |
| 2004/0057024 A1 * | 3/2004 | Nishio et al. | 353/94 |
| 2006/0017991 A1 | 1/2006 | Poulsen | |
| 2006/0082876 A1 | 4/2006 | May et al. | |
| 2007/0133011 A1 | 6/2007 | Koh et al. | |

(Continued)

FOREIGN PATENT DOCUMENTS

DE    10 2006 059 132    6/2007

(Continued)

OTHER PUBLICATIONS

Machine translation of WO 2007/065694.*

(Continued)

*Primary Examiner* — Christopher Mahoney
(74) *Attorney, Agent, or Firm* — Faegre Baker Daniels LLP

(57) ABSTRACT

The invention concerns a rear projection system in the form of a table consisting of at least one glass panel which has a diffusion coating containing hollow glass balls, whereas the hollow glass balls are arranged in a transparent or translucent binder matrix on the lower or upper surface of the glass panel and is illuminated from below with at least one projector having a projection field and that at least one projection image can be viewed by an observer at an observation angle of at least 176 degrees.

The second embodiment involves a rear projection system in the form of a curved, two-dimensionally shaped glass panel having a diffusion coating containing hollow glass balls.

18 Claims, 4 Drawing Sheets

U.S. PATENT DOCUMENTS

| | | | |
|---|---|---|---|
| 2007/0229950 A1* | 10/2007 | Ouderkirk et al. | 359/454 |
| 2010/0053748 A1 | 3/2010 | Rohner et al. | |
| 2010/0202045 A1* | 8/2010 | Hannington | 359/453 |

FOREIGN PATENT DOCUMENTS

| | | |
|---|---|---|
| DE | 10 2006 048 473 | 4/2008 |
| DE | 10 2008 005 597 | 7/2009 |
| EP | 0 414 313 | 2/1991 |
| EP | 1 192 111 | 3/2004 |
| EP | 1 405 138 | 8/2005 |
| WO | 97/46995 | 12/1997 |
| WO | 2006/020583 | 2/2006 |
| WO | 2007/065694 | 6/2007 |

OTHER PUBLICATIONS

International Search Report and Written Opinion dated May 18, 2010 in PCT/EP2010/000324.

* cited by examiner

Unterseite

REAR PROJECTION SYSTEM, METHOD FOR PRODUCTION AND APPLICATION

CROSS-REFERENCE TO RELATED APPLICATION

This application is related to and claims the benefit under 35 U.S.C. §119 and 35 U.S.C. §365 of International Application No. PCT/EP2010/000324, filed Jan. 20, 2010, the disclosure of which is expressly incorporated herein by reference.

The subject matter of the invention is a rear-projection system and a method for its production and application.

In the DE t02006048473A1 a rear-projection wall is proposed which, however, is costly to produce and which also has a poor lateral viewing angle.

In the EP 0 414 313 B1, two light diffusing layers are arranged on a translucent plate. The first translucent layer involves a supplementary panel which is arranged in front of the second light diffusing plate. This arrangement also results in high production costs, as well as a poor lateral viewing angle.

The WO 2007/065694 A1 discloses a rear projection system with at least one panel, which comprises a diffusion layer, whereas the diffusion layer consists of hollow glass balls and is arranged in a transparent or translucent binder matrix on the lower or upper surface of the panel.

However, there is no indication that the rear projection system involves the use of a table in which it is essential to guarantee if possible that all people sitting at the table have an even, sharp and brilliant illumination.

Therefore, the present invention has the objective of producing a cost-effective rear-projection screen and improving the lateral observation angle to facilitate a rear projection system designed as a table.

The problem is solved by means of the technical information included in Claim 1.

The glass panel known from the WO 2007/065694 A1 which has hollow glass balls imbedded in a binder matrix consisting of glass frits or a polymer degrees for all people sitting at the table.

The hollow glass balls have an internal hollow space tilled with air or gas and at this internal surface there is a great refractive index different between the glass of the hollow glass balls and the enclosed glass.

The refractive index difference is almost independent from the refractive index of the glass or the surrounding binder matrix and results in the high angled diffusion effect. It is best to use hollow glass balls with an extremely narrow diameter tolerance, i.e., a d50 diameter, for example, of 30 μm or 60 μm up to 90 μm and a few μm tolerances, that is, an extremely narrow Gaussian distribution. In such a way, it is possible to achieve layers with an even thickness.

However, it is also possible to use hollow glass balls with two different sizes, for example, with a diameter ratio of 1:2 or above, for example, 30 μm and 60 μm up or 45 μm and 90 μm. Such a combination of hollow glass balls with two clearly different sized increases the packing density of the hollow glass balls from theoretically 74% of a closest packing of balls to theoretically up to 82% and, consequently, improves the diffusion effect. In practice, such dense ball packing densities cannot be achieved using a screen printing or roll coating or curtain-casting process. However, by means of this extremely cost-effective method excellent high angled diffusion effects can be achieved.

Such hollow glass balls are produced in a plurality of applications, for example, as filler material in thermoplastic injection molding or in the field of paint coat and thermal plaster materials. They are produced in large amounts at low costs and greatly vary with regard to glass material, diameter, diameter distribution and wall thickness.

In a further development of the invention, the hollow glass balls comprise also an outer diffusion coating.

In this way, a projection image—designed as a table—becomes visible also for the people sitting at the table and viewing the surface of the table at an extremely flat angle.

As a result, it is possible to achieve an almost 180° observation angle with a single layer arrangement of the hollow glass balls imbedded on the glass panel in a transparent or translucent binder matrix.

The invention is not restricted to the use of hollow glass balls. In addition, the binder matrix, into which the hollow glass balls are imbedded, can also be designed or dyed as a diffusion layer.

In a further development of the invention, provision has been made that when using safety glass in which a polymer composite film has been applied in the adhesive bond between the glass panels this polymer film should also be design or dyed as diffusion film.

Each of the three possibilities mentioned above should be protected standing alone. Moreover, any combination of two or three of the above-mentioned embodiments is claimed to be a substantial part of the invention.

Furthermore, the invention describes a method for producing such a rear-projection system by coating a glass panel with a diffusion layer consisting of a largely transparent to translucent binder matrix which contains homogenously dispersed hollow glass balls. Moreover,
the application is called a conference table, maintenance/entertainment table or interactive teaching table. In this context, it is known to design the interaction property in the form of detecting finger or pen movements. Said detection is performed by the control system of the projector system.

In a development of the invention, the rear-projection system is constructed as a glass panel or plastic sheet having a curved, two-dimensional design.

The subject matter of the present invention is not only reflected in the subject matter of the individual claims, but also in a combination of the individual claims.

All statements and characteristics disclosed in the documents, including the abstract, in particular the spatial arrangement shown in the drawings, are claimed to be a substantial part of the invention, provided they are new individually or in combination when compared to prior art.

Subsequently, the invention is explained in more detail by means of drawings which show several ways of execution. Here the drawings and their description disclose further characteristics and advantages of the invention that are a substantial part of the invention.

It is shown:

FIG. 1: A diagram of an invention-based rear-projection system (1) in the form of a table (6), FIG. 2: A diagram of an invention-based rear-projection system (1) in the form of a curved, two-dimensionally shaped glass panel (17), FIG. 3: A schematic detailed view of a glass panel (2) with a diffusion layer (3) positioned below, FIG. 4: A schematic detailed view of a composite safety glass panel (22) containing a diffusion layer (3), FIG. 5: A schematic detailed view of a glass panel (2) with a diffusion layer (3) positioned above, FIG. 6: A schematic detailed view of a composite safety glass pa (22) containing a diffusion layer (3) and having a polymer adhesion-promoting layer (21), FIG. 7: An enlarged representation of the structure of the diffusion layer, FIG. 8: Imbedding the hollow glass balls with a screen printing squeegee blade, FIG. 9: the layer of the diffusion layer produced according to FIG. 8.

FIG. 1 shows a diagram of an invention-based rear-projection system (1) in the form of a table (6). Especially when designing the glass panel (2) as a table leaf in the form of a table (6), the people (7, 8) sitting at the table have flat angles (11, 12).

However, the application of a rear-projection by means of projectors (13, 15) and the respective projection screens (14, 16) (or the respective projection images (23, 24)) requires a large observation angle. In this diagram, the bottom surface of the glass panel (2) is coated with a diffusion layer (3).

Said diffusion layer (3) is produced by a coating applied through a screen printing or roll coating or curtain-casting process with a compound or ink consisting of a binder matrix (5) involving homogenously dispersed hollow glass balls (4).

The binder matrix (5) can consist of a glass frit or glass solder coating used for the glass industry, which usually forms at a process temperature of approximately 620° C. an inorganic hard and abrasion-resistant layer. If the diffusion layer (3) does not have such high requirements, the binder matrix (5) can also consist of a polymer bonding agent, such as polyvinyl butyral (PVB) or polycarbonate (PC) or polymethyl methacrylate (PMMA and other highly transparent polymers which generally allow for drying temperatures of below 200° C., The hollow glass balls (4) used have an external diameter of approximately between 20 μm and 200 μm, preferably between 30 μm and 100 μm and comprise a specific weight ranging from 0.3 to 0.8 g/cm$^2$. Excellent results regarding an observation angle of virtually 180 degrees can be achieved by using, for example, soda lime borosilicate hollow glass balls from the company 3M called Scotchlite™ glass bubbles S60 or S60HS, which have an average diameter of 30 μm and a specific density of 0.60 g/cm$^2$.

Generally, 3M Scotchlite™ glass bubbles of the series K and S with a maximum diameter of 80 μm or 60 μm and d50 dimensions at 40 μm or 30 μm produce excellent results and because of their spherical shape, they can be printed very well by means of screen printing in the desired graphic arrangement. They are also very persistent within process temperature ranges for glass frit coating.

Besides the hollow glass balls of the company 3M, there is quite a number of manufacturers because such hollow glass balls re used as filler material in thermoplastic materials, as well as in various colors for improving their thermal properties. However, previously it has not been realized that such coated hollow glass balls could be used for rear-projection systems. In this regard, the design of the internal surface of the hollow glass balls is important for achieving the intended diffusion effect.

The great advantage of using hollow glass balls (4) is the fact that they can be completely imbedded in a binder matrix (5), not requiring partial imbedding, as this is known to be the case with customary road marking systems or auto-reflective or retro-reflective systems (motor vehicle license plate or street sign) and similar systems.

Furthermore, the binder matrix (5) can be dyed in translucent manner or finished in photochromic manner. This can increase the contrast of the projection in a bright environment. Basically, this can also be achieved by using tinted glass (2).

For safety-related reasons, the glass panel (2) is manufactured from a single-pane safety glass (ESG) or an annealed glass (TVG) or a composite safety glass (VSG). It is preferred to use white glass with low iron oxide content in order to achieve high transparency without color contamination. It is especially important that the surface of such a rear-projection system (1) is scratch-proof and easy to clean.

Furthermore, the upper glass can have an antireflection coating or a hard-coated surface or a prismatic design.

Besides the two projectors (13, 15) shown in the diagram, it is also possible to use only one projector or more than two projectors. This does not require a direct optical path (14, 16), it can be also deflected once or several times by means of mirror elements. The projector (13, 15) should be attached at the most ideal place of the table structure. Any type of projector used according to prior art can be used as projector. For example, it is possible to use so-called DMD beamers or LCD beamers or laser-supported beamers or any other projection equipment with a digital control facility.

It is also possible to use an interactive projection system according to prior art. For this purpose, laser scanning can be used or infrared cameras can be arranged or an electrically conductive line and column grid with a capacitive fingerprint sensor technology. In this regard, ti si of special advantage that the interactive input can take place with a finger as compared to an input with a special pen because a glass surface is easy to clean and can meet the highest hygienic requirements.

FIG. 2 shows a diagram of an invention-based projection system in the form of a curved, two-dimensionally shaped glass panel (17), wherein the person (18) is outlined standing to view a projection image (23) at an observation range (19). By using a special way of producing the diffusion layer (3), glass elements (17) can be manufactured in a plurality of two-dimensionally shaped objects. This requires the largest possible observation range.

FIG. 3 shows a schematic detailed view of a glass panel (2) with a diffusion layer (3) positioned below, which has a binder matrix containing homogenously dispersed hollow glass balls (4). In this embodiment, the upper glass surface can have additionally an antireflection coating or a hard-coated surface or a prismatic design. The diffusion layer (3) has a thickness of between 15 μm and 500 μm, preferably between 20 μm and 100 μm, whereas depending on the maximum diameter of the hollow glass balls (4) selected the glass balls can be raised from the binder matrix (5). Ideally and preferably the density of the hollow glass balls (4) is selected to be in the form of a hexagonal monolayer. However, even hollow glass balls (4) arranged somewhat offset in height do not visually interfere with the projection properties.

FIG. 4 shows a schematic detailed view of a composite safety glass panel (22) containing a diffusion layer (3). For this purpose, a polymer bonding agent is used, for example, polyvinyl butyral (PVB) or ethylene vinyl acetal copolymer (EVA) or polyvinyl alcohol (PVA) or a terpolymer with ethylene, vinyl acetate and vinyl alcohol units or a polyvinyl chloride (PVC) containing homogenous hollow glass balls (4) dispersed therein.

Preferably, by means of a polymer bonding agent (21), a PVB film with a typically 370 μm thickness or a dual or triple thickness is bonded with the glass panel in a lamination process, for example in an autoclave, producing a composite safety glass panel (22). Such a design is extremely robust and fulfills high safety requirements. In addition, it is possible to integrate a transparent thermoplastic film in the internal PVB laminated structure, for example a polycarbonate film, additionally increasing the stability of the glass composite. This film can be designed as an additional diffusion film. This can be achieved by dyeing the film.

Figure 1:
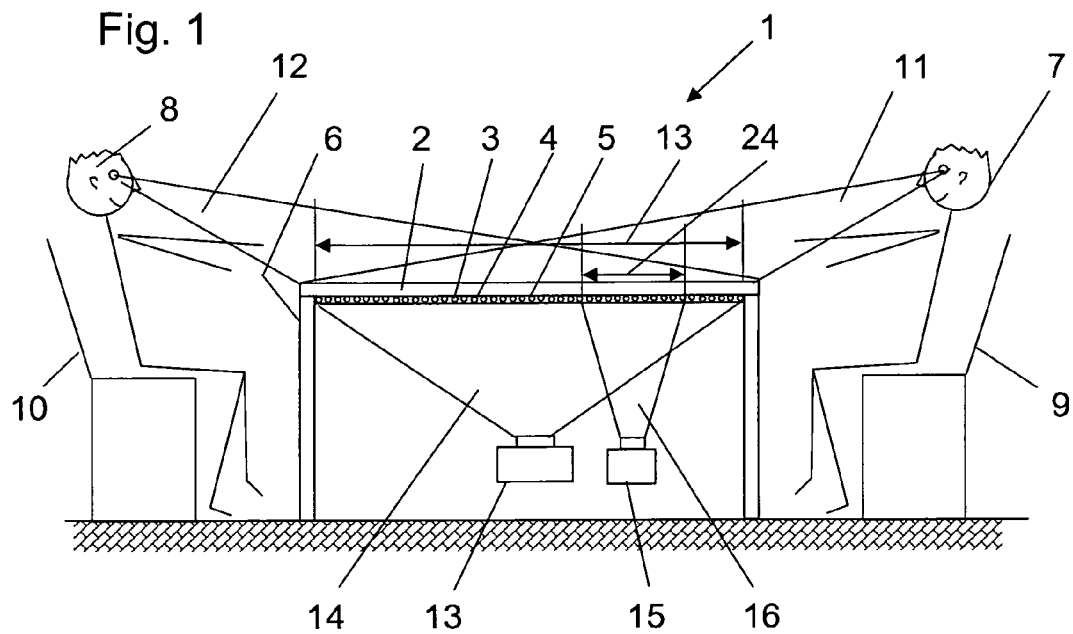
Figure 2:
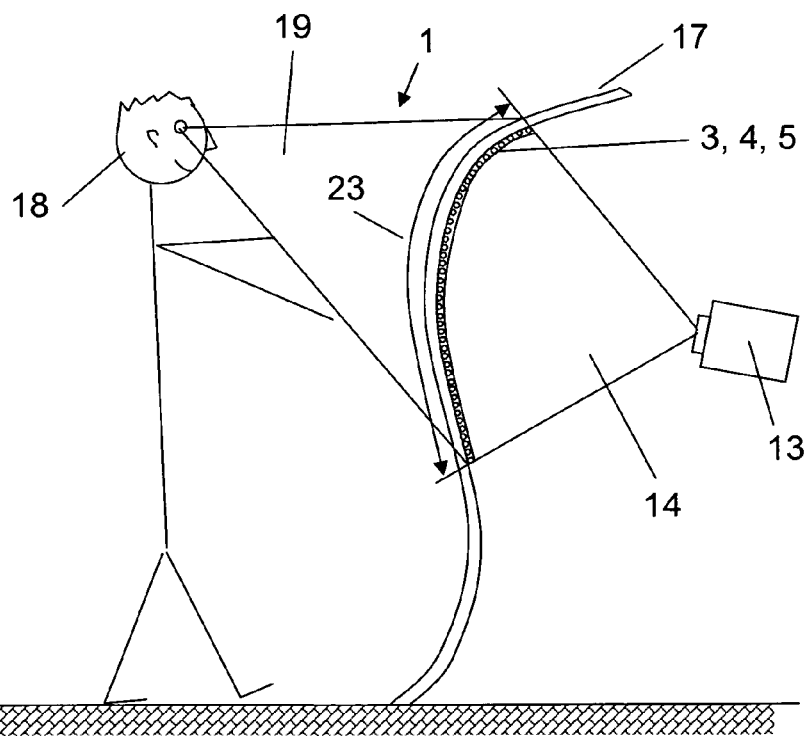
Figure 3:
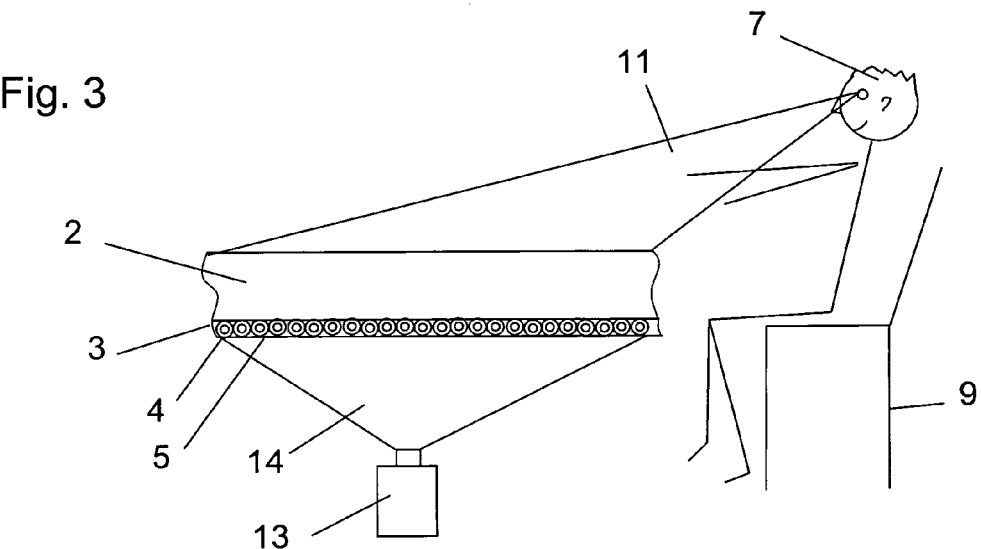
Figure 4:
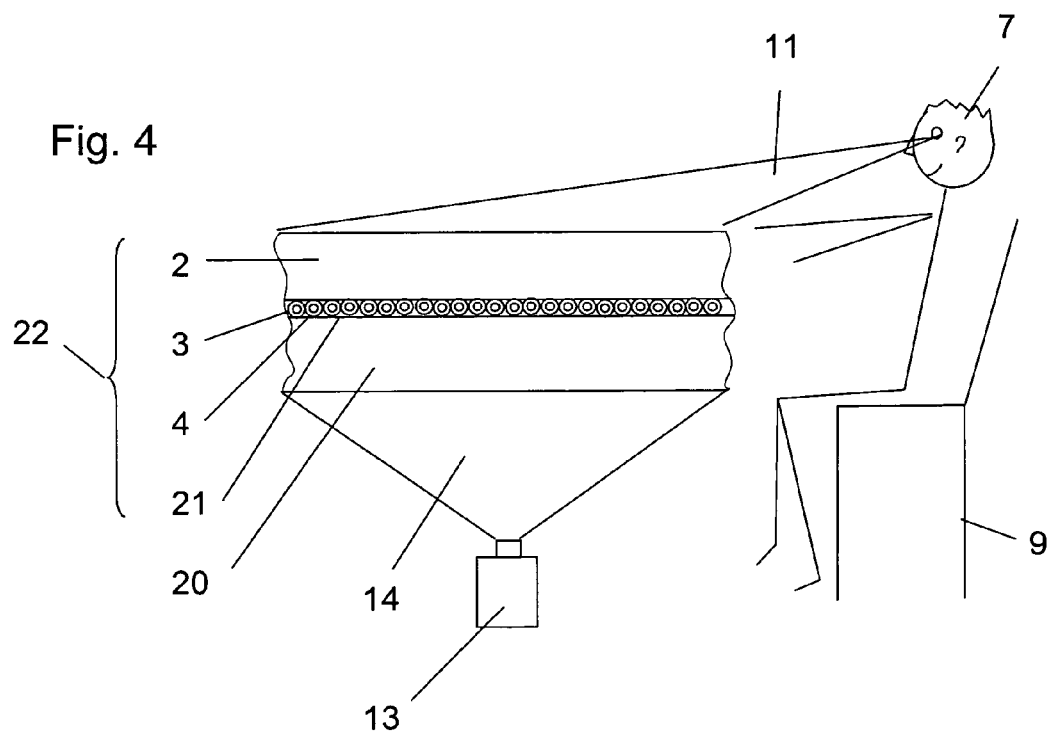
Figure 5:
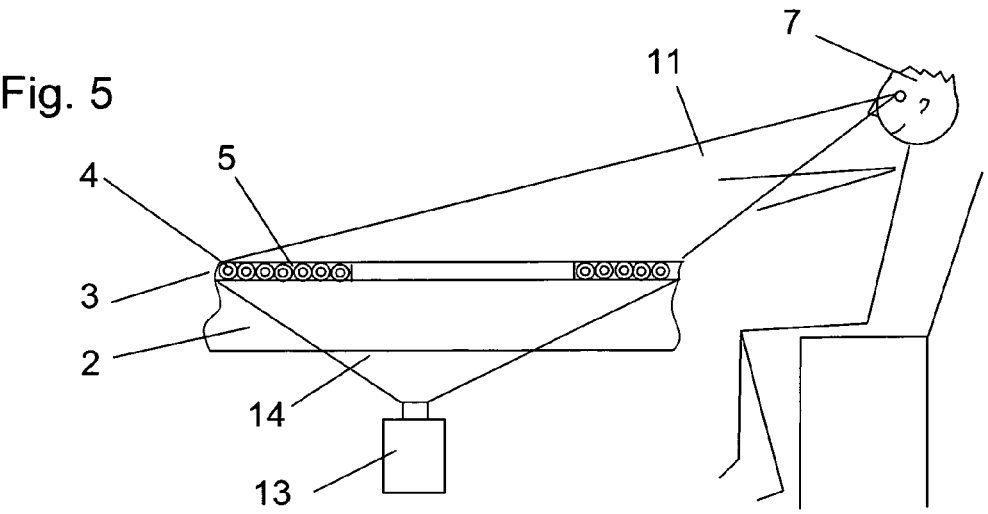
FIG. 5 shows a schematic detailed view of a glass panel (2) with a diffusion layer (3) positioned above. Preferably, in this embodiment a glass frit binder matrix (5) containing homogenously dispersed hollow glass balls (4) is used, because it provides high abrasion resistance and has excellent anti-reaction properties.
Figure 6:
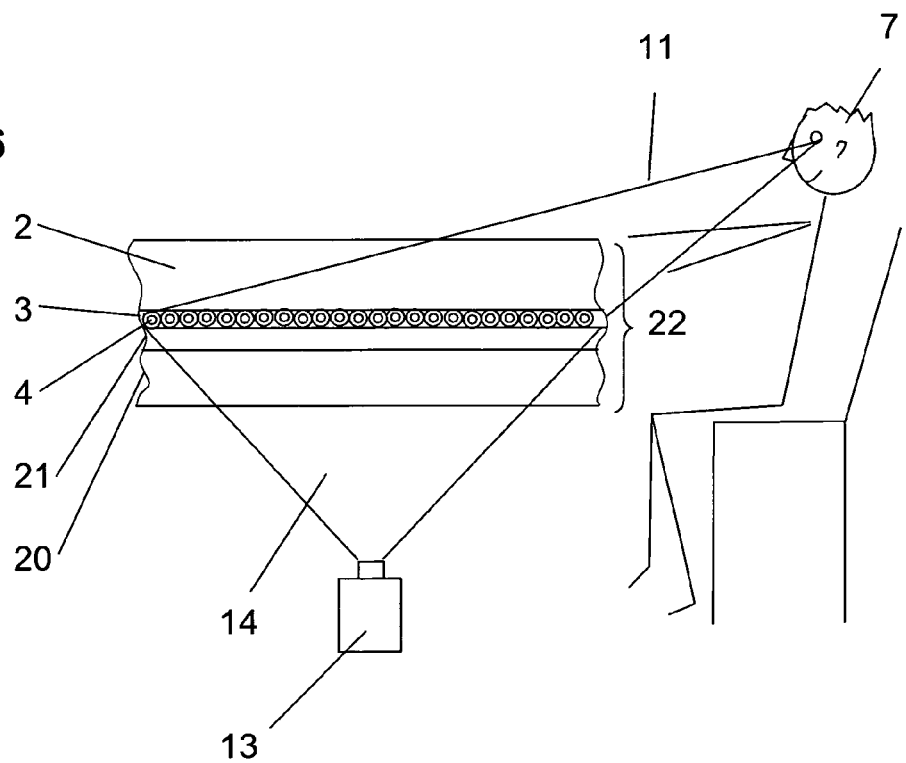
FIG. 6 shows a schematic detailed view of a composite safety glass panel (22) containing a diffusion layer (3) and having a polymer adhesion-promoting layer (21). In this special embodiment, the design described in FIG. 3 is used.
Figure 7:
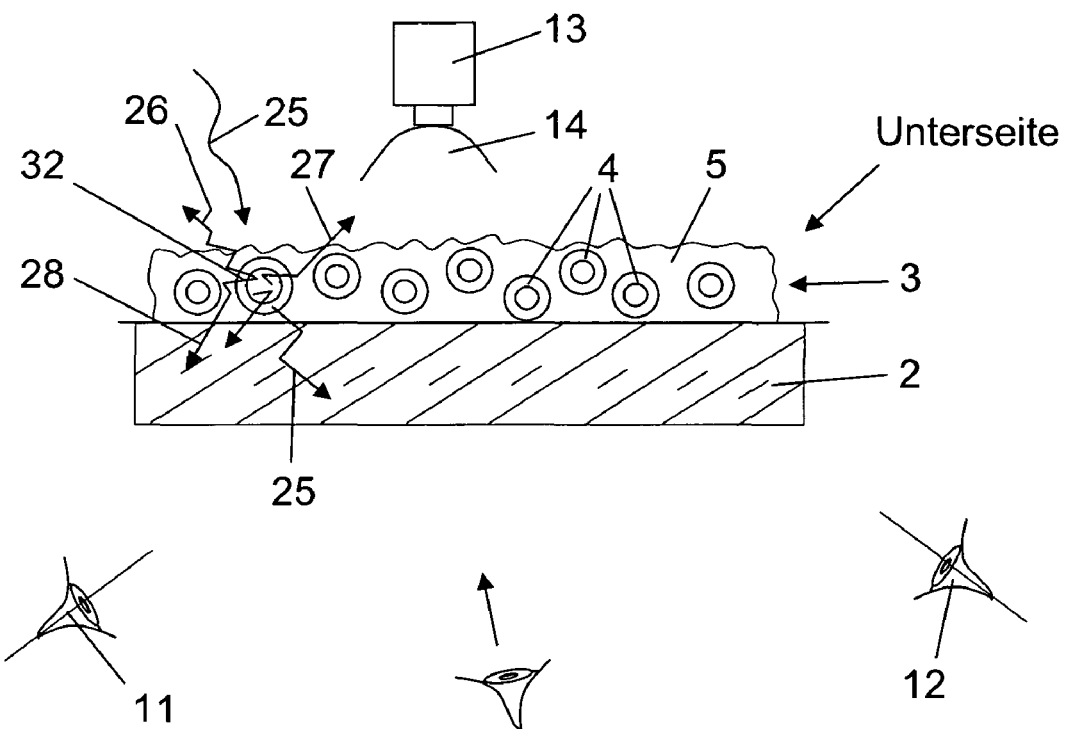

FIG. 7 shows an enlarged cut through the structure. Instead of designing the panel as a glass panel (2), the panel can also consist of plastic material. Such a plastic sheet can be two-dimensionally or three-dimensionally shaped, in order to obtain—in the case of a three-dimensional shape—a spatial rear projection system.

Preferably, the plastic sheet is produced from polycarbonate and can have an additional hard-coated surface.

FIG. 7 shows that a light beam (25) coming on the layer of the coated hollow glass balls (4) is scattered in all marked directions of the arrow 26-29, resulting in a 360 degree scattering angle. For example, the light beam scattered in the direction of the arrow (27) t the internal surface of the hollow glass balls (4) impinges the surface of the adjacent hollow glass balls (4) and is there also reflected in diffuse manner. Here, the reflection takes place in the internal space of each hollow glass ball (4) at the interior layer of the hollow space of the hollow glass balls (4). In the projection with one or both projectors (13, 15), this results in a brilliant color reproduction with a high degree of efficiency.

Figure 8:
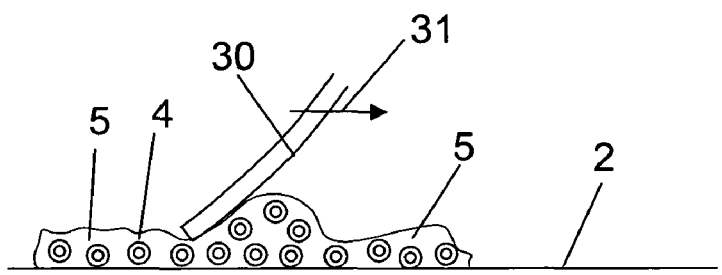

FIG. 8 shows an especially simple way of producing the diffusion layer (3) on the glass panel (2). In the not yet solidified, pasty plastic layer or glass frit layer of the binder matrix, the hollow glass balls (4) are dispersed as homogenously as possible. The surface is now scraped with a screen printing squeegee blade (30), resulting in an extremely thin diffusion layer (3) in which the hollow glass balls are preferably arranged in a basically single-layer formation. The excess material is removed by the screen printing squeegee blade (30). Then the layer hardens and the hollow glass balls (4) are permanently bound.

Figure 9:
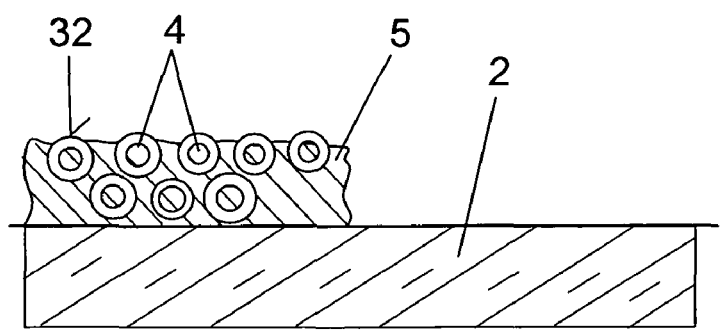

FIG. 9 shows that it is also possible to provide more than one layer of the hollow glass balls or to provide hollow glass balls with two different diameters and to have them to some extent protrude from the upper surface of the diffusion layer. Preferably the larger hollow glass balls (4) are arranged in a single layer in the binder matrix. They do not have to be completely covered by the binder matrix (5). However, when using the production process screen print, scraping, roll coating, curtain casting, they are generally covered with a thin layer.

Reference list

1 Rear projection system
2 Glass panel
  Single-pane safety glass (ESG),
  annealed glass (TVG),
  composite safety glass (VSG)
3 Diffusion layer
4 Hollow glass balls
5 Binder matrix or
  Adhesive matrix: glass frits or
  Polymer binder matrix
6 Table
7 Viewer on the right
8 Viewer on the left
9 Chair on the right -continued Reference list 10 Chair on the left
11 Observation range of the person on the right
12 Observation range of the person on the left
13 First projector
14 Projection field of the first projector
15 Second projector
16 Projection filed of the second projector
17 Curved glass panel
18 Viewer standing
19 Observation range
20 Second glass panel of a composite safety glass (VSG)
21 Polymer bonding agent
22 Composite safety glass (VSG)
23 Projection image of the first Projector
24 Projection image of the second Projector
25 Light beam
26 Direction of arrow
27 " "
28 " "
29 " "
30 Screen printing squeegee blade
31 Direction of arrow
32 Diffuser coating

The invention claimed is:

1. A rear projection system comprising at least one panel comprising at least one diffusion layer, wherein the diffusion layer comprises a plurality of hollow glass balls arranged in a transparent or translucent binder matrix on the lower or upper surface of the panel, wherein the panel comprising the diffusion layer is designed as a table and a projector is arranged below the table and illuminates the bottom surface of the table, and wherein the plurality of hollow glass balls comprises a composition of hollow glass balls having two diameters wherein the ratio of one diameter to the other diameter is 1:2 or above, and wherein the hollow glass balls of the greater diameter are arranged in a single layer in the binder matrix.

2. A rear projection system according to claim 1, wherein the hollow glass balls form a single layer in the binder matrix.

3. A rear projection system according to claim 2, wherein the binder matrix comprises a glass frit or glass solder matrix.

4. A rear projection system according to claim 2, wherein the binder matrix comprises a polymer bonding agent, such as polyvinyl butyral (PVB) or ethylene vinyl acetal copolymer (EVA) or polyvinyl alcohol (PVA) or a terpolymer with ethylene, vinyl acetate and vinyl alcohol units or a polyvinyl chloride (PVC).

5. A rear projection system according to claim 2, wherein the panel comprising the diffusion layer is designed as a glass panel.

6. A rear projection system according to claim 1, wherein the binder matrix comprises a glass frit or glass solder matrix.

7. A rear projection system according to claim 6, wherein the binder matrix comprises a polymer bonding agent, such as polyvinyl butyral (PVB) or ethylene vinyl acetal copolymer (EVA) or polyvinyl alcohol (PVA) or a terpolymer with ethylene, vinyl acetate and vinyl alcohol units or a polyvinyl chloride (PVC).

8. A rear projection system according to claim 6, wherein the panel comprising the diffusion layer is designed as a glass panel.

9. A rear projection system according to claim 1, wherein the binder matrix comprises a polymer bonding agent, such as polyvinyl butyral (PVB) or ethylene vinyl acetal copolymer (EVA) or polyvinyl alcohol (PVA) or a terpolymer with ethylene, vinyl acetate and vinyl alcohol units or a polyvinyl chloride (PVC).

10. A rear projection system according to claim 9, wherein the binder matrix comprises a glass frit or glass solder matrix.

11. A rear projection system according to claim 9, wherein the panel comprising the diffusion layer is designed as a glass panel.

12. A rear projection system according to claim 1, wherein the panel comprising the diffusion layer is designed as a glass panel.

13. A rear projection system according to claim 12, wherein the binder matrix comprises a polymer bonding agent, such as polyvinyl butyral (PVB) or ethylene vinyl acetal copolymer (EVA) or polyvinyl alcohol (PVA) or a terpolymer with ethylene, vinyl acetate and vinyl alcohol units or a polyvinyl chloride (PVC).

14. A rear projection system according to claim 1, wherein the panel comprising the diffusion layer is designed as a plastic sheet.

15. A rear projection system according to claim 1, wherein the hollow glass balls themselves comprise a diffusion coating.

16. A rear projection system according to claim 1, wherein the lower surface of the panel is a light receiving surface and the upper surface of the panel is a light emitting surface, and the panel comprises an additional light-diffusing coating on the light emitting surface or on the light receiving surface or on both surfaces.

17. A rear projection system comprising at least one panel comprising at least one diffusion layer, wherein the diffusion layer comprises hollow glass balls and is arranged in a transparent or translucent binder matrix on the lower or upper surface of the panel, wherein a projector is arranged below the panel and illuminates the bottom surface of the panel, the hollow glass balls are arranged in a binder matrix in the form of a curved, two-dimensionally shaped glass panel or plastic sheet, and the plurality of hollow glass balls comprise a composition of hollow glass balls having two diameters wherein the ratio of one diameter to the other diameter is 1:2 or above, and wherein the hollow glass balls of the greater diameter are arranged in a single layer in the binder matrix.

18. A method for producing a rear projection system comprising at least one panel comprising at least one diffusion layer, wherein in a first procedural step hollow glass balls are dispersed in a binder matrix in a homogenous manner, in a second procedural step the binder matrix provided with hollow glass balls is applied to the whole surface of the panel or any other desired shape by using a screen printing or scraping or roll coating or curtain-casting process, and in a third procedural step solidifying takes place at approximately 620° C. or below 200° C., depending on the bonding agent selected, and wherein the plurality of hollow glass balls comprises a composition of hollow glass balls having two diameters wherein the ratio of one diameter to the other diameter is 1:2 or above, and wherein the hollow glass balls of the greater diameter are arranged in a single layer in the binder matrix.

* * * * *